United States Patent

Preston et al.

Patent Number: 5,934,415
Date of Patent: Aug. 10, 1999

[54] BRAKE ACTUATOR SERVICE LIMIT SENSOR

[75] Inventors: David M. Preston, Clarkston; G. Clark Fortune, Farmington Hills; James R. Clark, Plainwell; John-Cyril P. Hanisko, Southfield, all of Mich.

[73] Assignee: Dana Corporation, Toledo, Ohio

[21] Appl. No.: 08/863,655

[22] Filed: May 27, 1997

[51] Int. Cl.⁶ .................................................. F16D 66/00
[52] U.S. Cl. ................... 188/1.11 L; 200/574; 116/208
[58] Field of Search ................. 188/1.11 R, 1.11 W, 188/1.11 E, 1.11 L; 116/208, 281, 283; 200/61.4, 47, 61.41, 61.89, 573, 574

[56] References Cited

U.S. PATENT DOCUMENTS

| | | |
|---|---|---|
| 2,146,357 | 2/1939 | Schweikle . |
| 3,145,275 | 8/1964 | Gildart ................................ 200/61.41 |
| 3,298,466 | 1/1967 | Ayers, Jr. . |
| 3,776,329 | 12/1973 | Hope et al. . |
| 4,279,214 | 7/1981 | Thorn . |
| 4,642,603 | 2/1987 | Martinez, Jr. . |
| 4,757,300 | 7/1988 | Sebalos . |
| 4,800,991 | 1/1989 | Miller . |
| 5,044,302 | 9/1991 | Goldfein et al. ..................... 116/208 |
| 5,141,295 | 8/1992 | Burgdorf et al. . |
| 5,206,625 | 4/1993 | Davis . |
| 5,207,299 | 5/1993 | Feldmann . |
| 5,226,312 | 7/1993 | Gautier et al. . |
| 5,226,509 | 7/1993 | Smith . |
| 5,253,735 | 10/1993 | Larson et al. . |
| 5,285,190 | 2/1994 | Humphreys et al. . |
| 5,310,023 | 5/1994 | Martinez . |
| 5,339,069 | 8/1994 | Penner et al. . |
| 5,358,075 | 10/1994 | Jarzombek . |
| 5,358,076 | 10/1994 | Lucas . |
| 5,441,128 | 8/1995 | Hoyt . |
| 5,450,930 | 9/1995 | Martens et al. . |
| 5,477,945 | 12/1995 | Klass et al. . |

FOREIGN PATENT DOCUMENTS

| | | |
|---|---|---|
| 0 419 207 A1 | 3/1991 | European Pat. Off. . |
| 0 545 063 A1 | 6/1993 | European Pat. Off. . |
| 2 319 880 | 2/1977 | France . |
| 35 02 053 A1 | 7/1986 | Germany . |
| 38 13 494 A1 | 11/1989 | Germany . |
| 40 17 952 A1 | 12/1991 | Germany . |
| 42 31 138 A1 | 3/1994 | Germany . |

*Primary Examiner*—Peter M. Poon
*Attorney, Agent, or Firm*—Liniak, Berenato, Longacre & White

[57] ABSTRACT

A brake actuator having a switch device mounted to an actuator housing with a spring member partially surrounding an actuator rod and adapted to contact a large diameter section of the actuator rod when brake wear causes the actuator rod to travel to a service limit position. In normal operation the spring member is separated from a small diameter section of the actuator rod. The switch device is mounted to a first end of the spring member having first and second electrical contacts which extend and electrically contact a conduction plate attached to a second end of the spring member as long as the brake actuator rod has not traveled to the service limit.

8 Claims, 4 Drawing Sheets

BRAKE ACTUATOR SERVICE LIMIT SENSOR

BACKGROUND OF THE INVENTION

1. Field of the Invention

The present invention relates to a system to measure the condition of a vehicle brake and, more specifically, to a system to detect and generate an electrical signal when the brake actuator travel exceeds a predetermined limit thereby indicating the need for brake service.

2. Description of the Prior Art

The mechanical adjustment of air brakes on trucks and other highway vehicles is a constant source of concern to vehicle owners, drivers and public officials whose duty it is to inspect and to check the road worthiness of such vehicles. In the case of air brakes, various devices have been designed to assist and to expedite the process; some of which are very simple, others of which tend to be relatively complex and, in all likelihood, relatively costly.

A common type of air brake system for trucks utilizes an actuator associated with each brake. The actuator has an opening in one side through which an actuator rod extends, the actuator rod being in turn connected to the actual vehicle brake through a suitable mechanical linkage such as an automatic slack adjuster which is well known in the art. When the vehicle brakes are not being applied, a spring or the like within the actuator holds the push rod in a relatively retracted position when the brake is off. However, when an operator applies the brakes, pressurized air is supplied to the actuator and the pressurized air causes the actuator rod to move along its longitudinal axis, in a direction out of the actuator. This movement continues until the brake engages and provides a return force that balances the force provided by the air pressure.

As the brake wears, the push rod must move through a larger and larger distance from its retracted position to an extended position in which the brake is applied. An automatic slack adjuster takes care of a certain amount of linkage adjustments due to wear but if the process continues uncorrected, the actuator rod travel will gradually reach its upper limit, determined by the geometry of the actuator. When this occurs, the brakes will not be effective even when fully applied by the vehicle operator. Because of this, in the U.S., trucking regulations place an upper limit of two inches on the maximum amount of actuator rod travel between its retracted and extended positions.

Two basic types of solutions have been provided to address the problem of wear in air brake systems. The first of these solutions is a device known as a slack adjuster that is included in the linkage between the actuator rod and the brake. A slack adjuster removes slack from this linkage, thereby reducing the amount of actuator rod travel necessary before the brakes are applied. Both automatic and manual slack adjusters are well known and in use. In an automatic slack adjuster, the slack removal operation is automatic, and occurs whenever a predetermined degree of slack develops in the linkage. However, an automatic slack adjuster is a relatively expensive and complex device, and is subject to occasional malfunction. A manual slack adjuster must be adjusted manually whenever excessive actuator rod travel develops in the brake system. However in general, an operator has no means of readily determining when such wear exists.

In order to overcome the limitations of existing slack adjusters or for use with manual adjustment systems, a variety of brake wear indicators have been devised to provide an indication to an operator that excess actuator rod travel has developed. For example, U.S. Pat. No. 4,279,214 describes a brake wear indicator that comprises a sleeve that extends around the actuator rod and through the opening in the actuator through which the actuator rod extends. A relatively loose fit is provided between the indicator and the actuator rod, and a comparatively snug fit is provided between the indicator and the actuator. When the brakes are applied, the indicator is forced out of the actuator along with the actuator rod. When the brakes are subsequently released, the fit between the indicator and the actuator prevents the indicator from retracting. Thus at any given time, visual inspection of the indicator will indicate the maximum travel of the actuator rod since the indicator was last reset into its retracted position. While effective in principle, the brake wear indicator disclosed in this patent suffers from the problem that there is considerable variation in the size of the opening in the side of the actuator through which the actuator rod extends. Thus, in practice, indicators of various outside diameters must be provided in order to cover the different brands and models of actuators currently in use. In addition, no electronic signal is generated that can be used to alert the operation or the need for service without a visual inspection of each brake assembly.

One of the simplest kind of devices is a split ring plastic sleeve designed to slip over the air pressure chamber actuator rod, and thereafter provide a visual indication of actuator rod travel distance or stroke extension. Excessive actuator rod travel indicates a level of brake lining wear that warrants replacement of the linings. Another device which likewise acts as a visual indicator involves modification to the actuator rod itself. A colored band is painted into a groove circumferentially machined in the actuator rod.

U.S. Pat. No. 3,298,466 discloses a brake wear indicator that comprises an extension of the return spring of the actuating cylinder that extends from the interior of the actuating cylinder to the exterior where it is visible for inspection. When the brakes are applied, the return spring is compressed and the extension projects from the actuating cylinder. The greater the distance the extension projects the greater the wear of the brake linings.

The foregoing and other visual indicators are disadvantageous by reason of their dependence on vision. The ability to see can be hampered by darkness, or by dirt, mud or slush picked up form the road. Further, it can be an awkward and sometimes messy job to move into a position that enables a visual check to be made. Also, more importantly, no warning is given to the operator in the cab so that immediate service can be obtained.

Prior art slack adjusters have used switching devices to signal when the brake adjuster has reached the end of its available travel thereby signaling the need for brake service. Examples of such devices are disclosed in U.S. Pat. Nos. 3,776,329; 5,253,735; 5,285,190; 5,339,069 and 5,358,075 the disclosures of which are hereby incorporated by reference. The switch, which is mounted to the slack adjuster, is electrically connected to a monitoring device using two connecting wires. These types of devices function to electrically signal when the brake slack adjuster has traveled to its service limit thereby notifying the operator of the need for brake service.

Another method of signaling when brake service is required is a system to monitor the travel of the pushrod of the brake actuator. One such device is described in U.S. Pat. No. 4,757,300 to Sebalos, the disclosure of which is hereby incorporated by reference. According to Sebalos, a magnet is secured to the actuator rod of a brake actuator which magnetically activates a switch mounted to the housing of the brake actuator when the rod travels to its service limit. The switch is connected to an electronic circuit to alert the operator of the need for brake service.

U.S. Pat. No. 5,310,023, the disclosure of which is hereby incorporated by reference, describes a sensor for detection of the overtravel of a brake actuator rod having a piston using a pair of conductors attached to an actuator piston housing such that an electrical circuit is closed when the piston travels to the section of the actuator piston housing incorporating the conductors which represents a travel limit condition thereby completing the circuit.

U.S. Pat. No. 5,450,930, the disclosure of which is hereby incorporated by reference, uses a sensor mounted inside the actuator housing where the sensor is activated by a structure attached to the actuation rod. The sensor can be a magnetic structure, a contacting switch(es) or a load cell.

These and other prior art systems have the limitations of overly complicated structures that must be supported and are prone to failure. In the case of visual systems, no signal is directly available to the driver while operating the vehicle which could result in an overworn brake condition prior to a service inspection.

SUMMARY OF THE INVENTION

The present invention provides an apparatus for electronically signaling when excessive brake wear has occurred in a brake of the type which uses a moveable actuator rod to displace an actuator linkage to activate the brake. A switch is mounted to the actuator housing so as to engage a specific increased diameter section of the actuator rod when the travel of the rod approaches or exceeds a predetermined service limit although the switch can be of the type known in the art as "normally closed" or conversely of the type known as "normally open" depending on the nature of the signal to be provided to the monitor electronics. In the preferred embodiment, the switch is normally closed by action of a spring member which encircles the actuator rod although the switch is activated by the action of the spring which holds the switch in an activated position when the actuator travel is within prescribed operational limits. When the spring contacts a larger diameter section of the rod, the spring is moved to open the switch to signal when the actuator rod has reached a service limit position and the brakes need replacement or further adjustment.

According to the present invention, the switch assembly is mounted to a first end of the spring member and has contacts which extend to electrically contact a second end of the spring member when the spring member is encircling the smaller diameter section of the actuator rod. The switch contacts can be environmentally sealed using a rubber boot member. As the spring member encounters the larger diameter section of the actuator rod, the contacts are pulled away from the second end of the spring member thereby electrically opening a circuit. In the preferred embodiment, the switch contacts are mounted in a switch assembly on the first side of the spring member and the spring assembly is mounted to the actuator housing to encircle the actuator rod.

One provision of the present invention is to provide a switching device to electrically indicate when a brake actuator has reached a predetermined travel limit.

Another provision of the present invention is to provide a switching device mounted to the outside of the actuator housing to electrically indicate when a brake actuator has reached a predetermined travel limit.

Another provision of the present invention is to provide a switching device actuated by a change in the diameter of the actuator rod of a brake actuator when the brake actuator has reached a predetermined travel limit.

Another provision of the present invention is to provide a switching device mounted to a first end of a spring member having electrical contacts which extend to make electrical contact with a second end of the spring member when a brake actuator is within its travel limits.

Another provision of the present invention is to provide a spring member mounted to the outside of a brake actuator housing which encircles the actuator rod where the spring member is forced apart by a larger diameter section of the actuator rod when a predetermined travel limit position is reached.

Still another provision of the present invention is to provide an environmentally sealed switching device mounted to the first end of a spring member where the spring member is activated by contacting a larger diameter section of an actuator rod.

DETAILED DESCRIPTION OF THE PREFERRED EMBODIMENT

Figure 1:
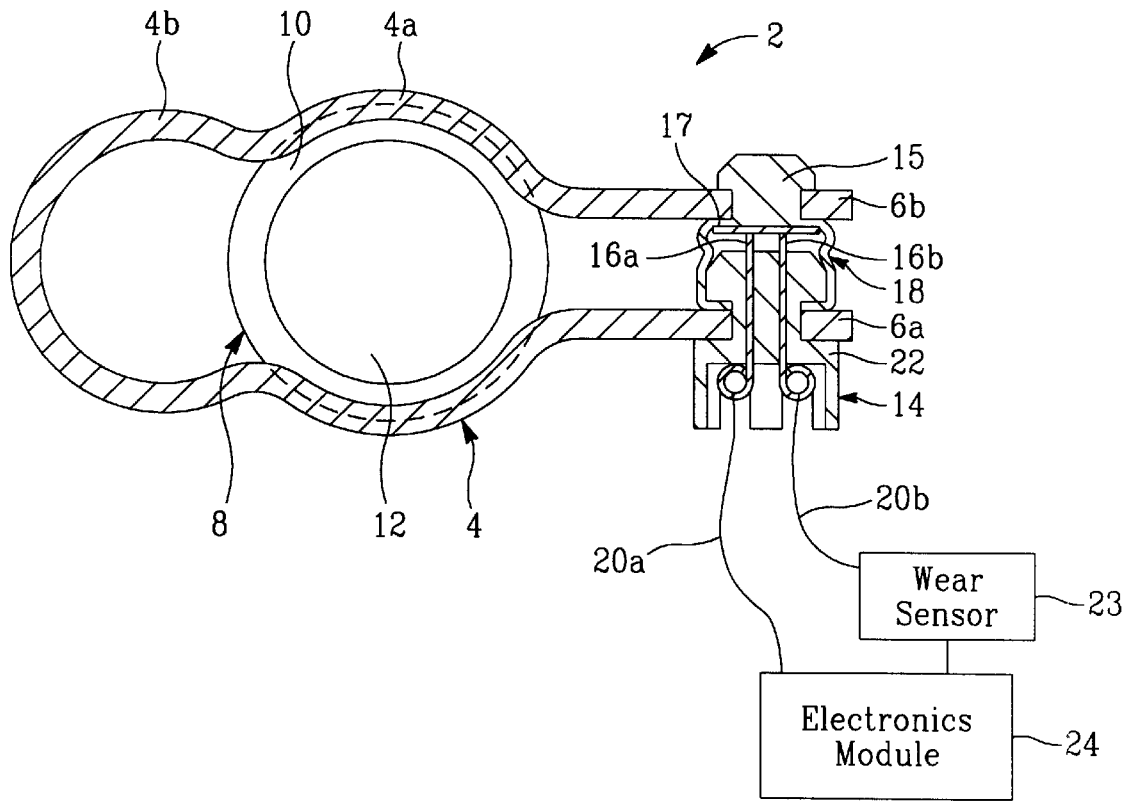
FIG. 1 is a cross-sectional view of the actuator rod, spring member and switch device of the present invention in a normal position.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Now referring to FIG. 1, a cross-sectional view of the travel limit sensor 2 of the present invention in a normal position is shown. The spring member 4 is made of a flexible material and has a first section 6A and a second section 6B where the spring member 4 encircles the actuator rod 8 of a brake actuator. The spring member 4 is comprised of a rod section 4A and a spring section 4B which is attached to the major section 4A and provides a spring force thereto. The actuator rod 8 has a large diameter section 10 joined to a small diameter section 12 and axially extends out of the brake activator housing 29 (see FIG. 4) passing through the rod section 4A of the spring member 4. The large diameter section 10 preferably has a simple increase in diametrical cross-section as compared to the small diameter section 12 but could consist of only a section of the actuator rod 8 having an increased cross-sectional dimension. A switch assembly 14 is mounted to the first section 6A of the spring member 4 and has electrical contacts 16A and 16B which extend from switch assembly 14 to make electrical contact with a conduction plate 17 which electrically connects 16A to 16B when the spring member 4 is in its normal state thereby closing the switch assembly 14. The conduction plate 17 is attached to a plate housing 15 which is molded from a flexible electrical insulating material into an opening formed in the second section 6B of the spring member 4. The plate housing 15 extends to form a dust boot 18. A contact housing 22 mounts to the first section 6A of the spring member 4 and holds the electrical contacts 16A and 16B in position. The contact housing 22 is molded from an electrical insulation material and is molded into an opening formed in the first section 6A of the spring member 4. The dust boot 18 extends from the conduction plate housing 15 to the contact housing to cover the contacts 16A and 16B for environmental protection.

The rod section 4A of the spring member 4 surrounds the larger diameter portion 10 of the actuator rod 8 when the actuator rod 8 has reached and/or exceeded a predetermined travel limit. The spring section 4B provides a contraction force to the spring member 4 to maintain contact between the conduction plate 17 and the electrical contacts 16A and 16B when the spring member 4 is not in contact with the large diameter section 10 of the actuator rod 8. The switch assembly 14 is electrically connected to an electronics module 24 by wire connector 20A and to a brake shoe wear sensor 23 by connector 20B.

It would also be possible to fashion the actuator rod 8 having the large diameter section 10 in the area of acceptable travel of the actuator while the small diameter section 12 is in the area of unacceptable travel. In this configuration the switch assembly 14 would be normally open with the rod section 4A contacting the large diameter section 10 and then close when the small diameter section 12 enters the rod section 4A.

Figure 2:
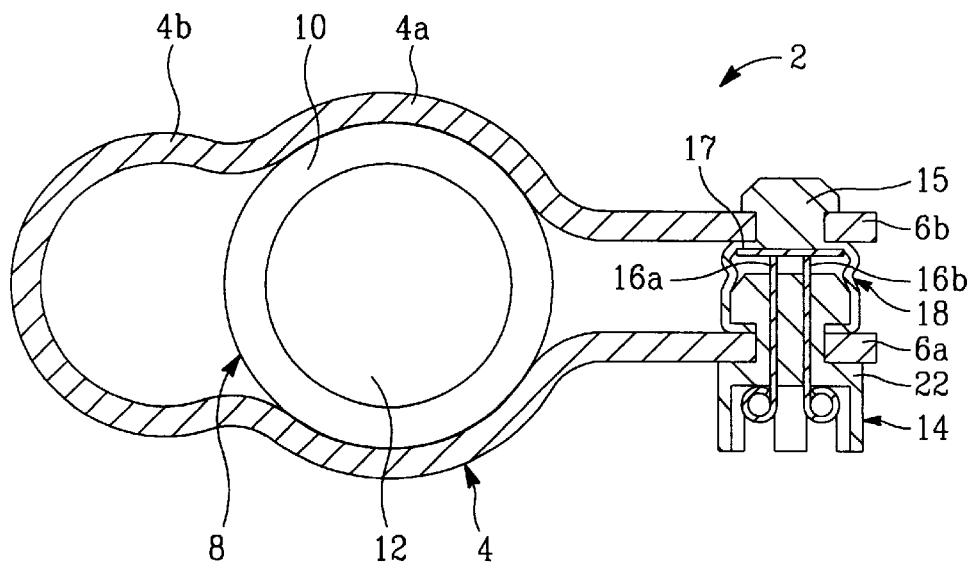
FIG. 2 is a cross-sectional view of the actuator rod, spring member and switch device of the present invention in a service position.

Now referring to FIG. 2 of the drawings, a cross-sectional view of the actuator rod 8, spring member 4 and switch device 14 of the present invention showing the travel limit sensor 2 and the actuator rod 8 in a service limit position. The actuator rod 8 passes through the spring member 4 without contact between the two elements, as long as the brake actuator 28 is within its normal operating range (see FIG. 1). Once the predetermined travel limit is reached, the actuator rod 8 passes through the travel limit sensor 2 in its large diameter section 10 and the rod section 4A contacts the actuator rod 8 at its large diameter section 10, first and second electrical contacts 16A and 16B are forced away from the conduction plate 17 and the electrical circuit is opened between the wire connections 20A and 20B to the wear sensor 23 and to the electronics module 24. The actuator rod 8 has moved out of the actuator housing 29 to the extent that the large diameter section 10 passes through the spring member 4 contacting and expanding the spring member 4 causing the first and second electrical contacts 16A and 16B to be pulled away from the conduction plate 17 which is attached to the second section 6B of the spring member 4.

Figure 3:
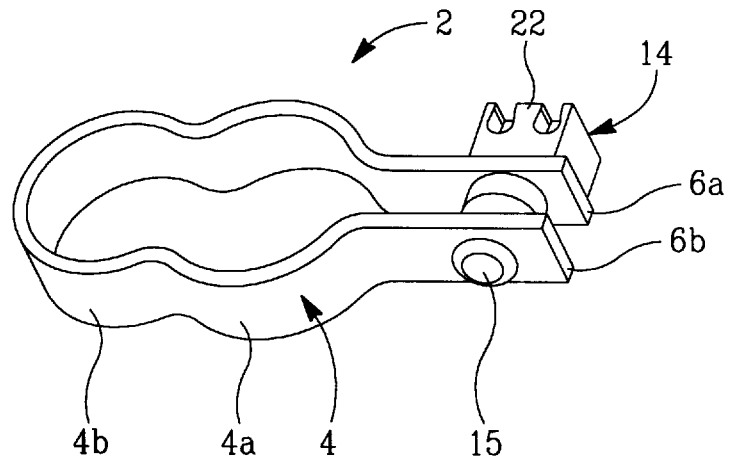
FIG. 3 is a perspective view of the spring member and switch assembly of the present invention.

FIG. 3 is a perspective view of the spring member 4 and switch assembly 14 of the present invention. The plate housing 15 is attached or molded onto the second section 6B of the spring member 4 while the contact housing 22 is attached or molded onto the first section 6A of the spring member 4. The rod section 4A partially encircles the actuator rod 8 while the function of the spring section 4B is to provide a restoring spring force to the spring member 4 tending to close the switch assembly 14.

Figure 4:
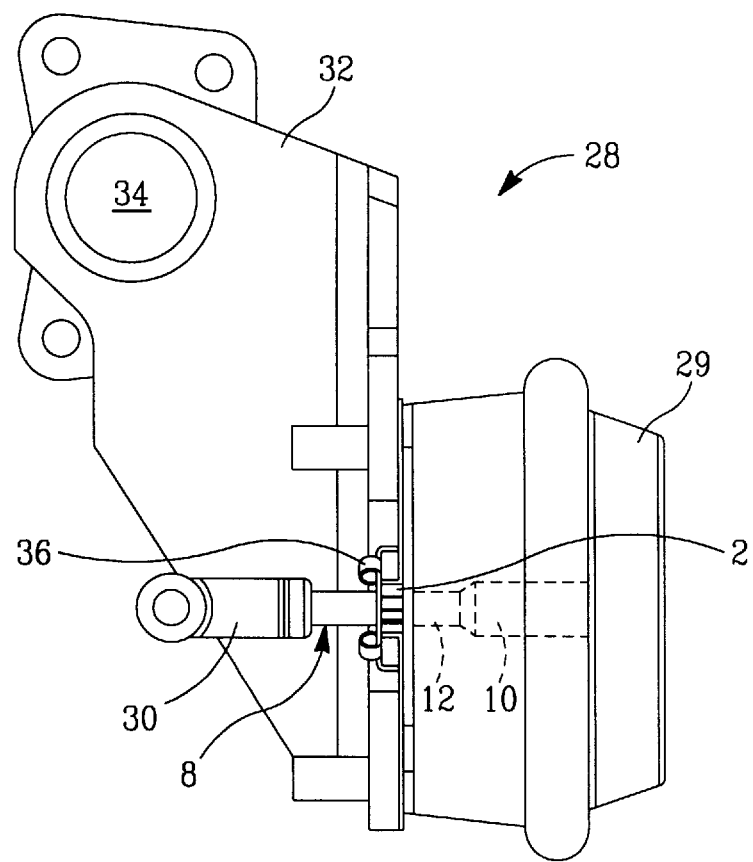
FIG. 4 is a side elevational view of the present invention mounted to a brake actuator housing.

Now referring to FIG. 4 of the drawings, a side elevational view of the present invention mounted to a brake actuator assembly 28 is shown. The actuator rod 8 axially extends from the actuator housing 29 and a rod clevis 30 is attached to the end of the actuator rod 8 for attachment to a slack adjuster (not shown) or another type of brake actuator linkage. Mounting bracket 32 is in some manner attached to the axle of the vehicle and supports the brake actuator 28 and a rotating shaft (not shown) which passes through shaft opening 34 to the brake and, for example, is connected at one end to the slack adjuster and at a second end to an S-cam. A switch bracket 36 is mounted between the mounting bracket 32 and the actuator housing 29 to position the travel limit sensor 2. A switch bracket 32 allows the travel limit sensor 2 to move slightly relative to the actuator rod 8 to allow for tolerancing and free-play in the actuator rod 8 relative to the actuator housing 29. The switch bracket 32 is trapped between the actuator housing 29 and the mounting bracket 32. The rod clevis 30 is shown attached to the end of actuator rod 8 where the actuator rod 8 extends through the spring member 4 and has a large diameter section 10 and a small diameter section 12 where the small diameter section 12 passes through the spring member 4 without contacting the major section 4A. The large diameter section 10 is not visible since it is located inside of the actuator housing 29 under normal conditions until the service limit of travel is reached when the large diameter section 10 enters the spring member 4.

Figure 5:
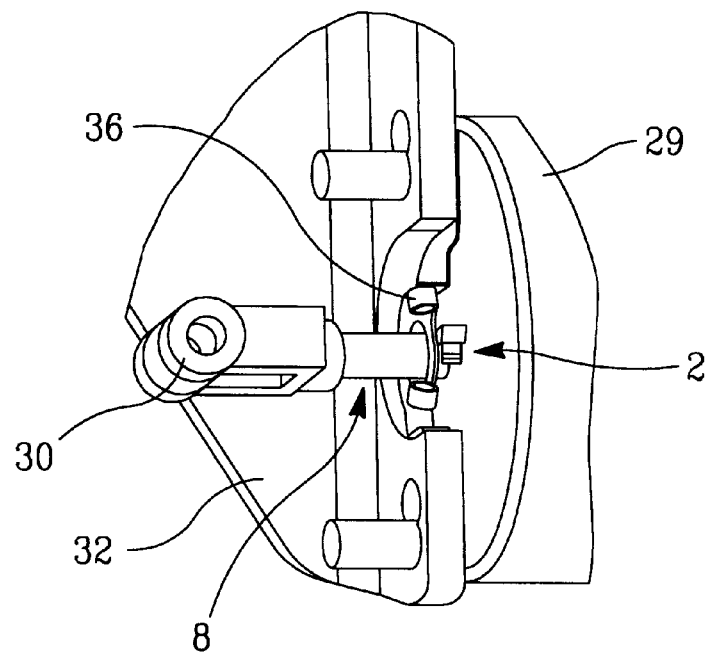
FIG. 5 is a partial perspective view of the present invention mounted to a brake actuator housing.

FIG. 5 is a partial perspective view of the present invention mounted to a brake actuator housing 29. The travel limit sensor 2 is trapped between the actuator housing 29 and the switch bracket 32 and is allowed to move slightly relative to the actuator housing 29 to accommodate misalignment and movement of the actuator rod 8.

Figure 6:
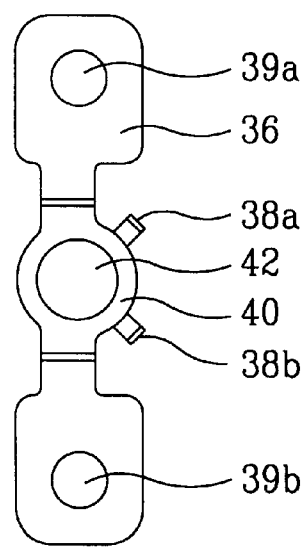
FIG. 6 is an elevational view of the mounting bracket of the present invention.

Now referring to FIG. 6, an elevational view of the switch bracket 36 of the present invention is shown. Two bolt openings 39A and 39B allow for mounting to the actuator housing 29. The retainer section 40 is offset to capture the travel limit sensor 2 but allow for its movement relative to the actuator housing 29. Two connector supports 38A and 38B are used to restrain the electrical wire connectors 20A and 20B. A large rod opening 42 provides clearance for passage of the actuator rod 8 through the switch bracket 36.

Figure 7:
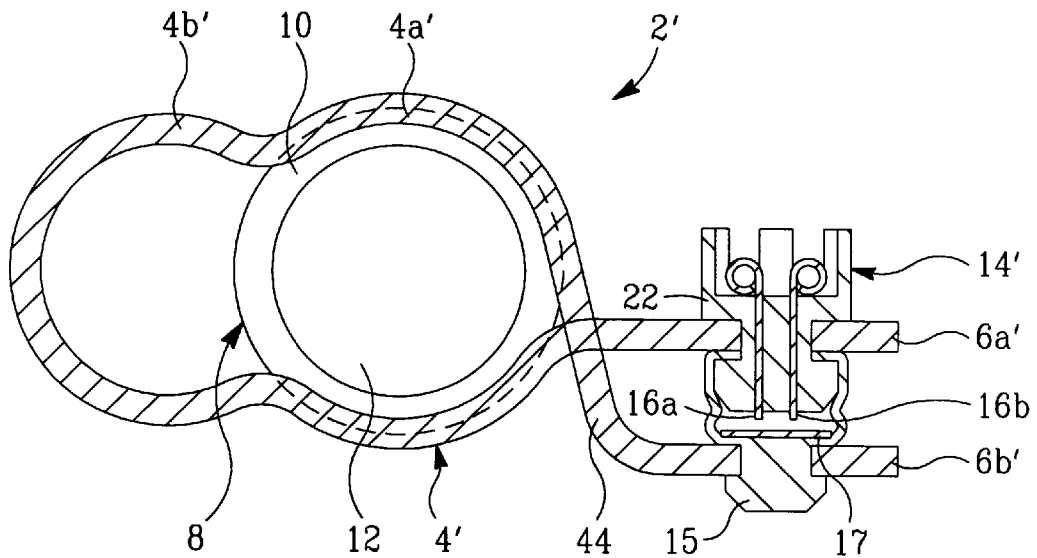
FIG. 7 is a cross-sectional view of a first alternate embodiment of the present invention.

Now referring to FIG. 7, a cross-sectional view of a first alternate embodiment of the travel limit sensor 2' of the present invention is shown. The spring member 4' operates in the same manner as is previously disclosed, however, the switch assembly 14' has been modified so that the first and second electrical contacts 16A and 16B do not contact the conduction plate 17 until the large diameter section 10 of the actuator rod 8 passes through the spring member 4' at rod section 4A' forcing the spring member 4' open. Spring section 4B' functions to hold the first and second contacts 16A and 16B away from the conduction plate 17. The switch assembly 14' is mounted to a first section 6A' of the spring member 4' with an opposite orientation from that previously disclosed such that the first and second contacts 16A and 16B face toward the conduction plate 17 now mounted to a second end extension 44 which is slotted to pass over the first section 6A' (or vice versa). Thus, the switch assembly 14' is now normally open and closes when the rod section 10 contacts the large diameter section of the spring member 4'. The electronics module must be reprogrammed to accommodate the opposite switch action with a normal state being open and an abnormal state being closed.

Figure 8:
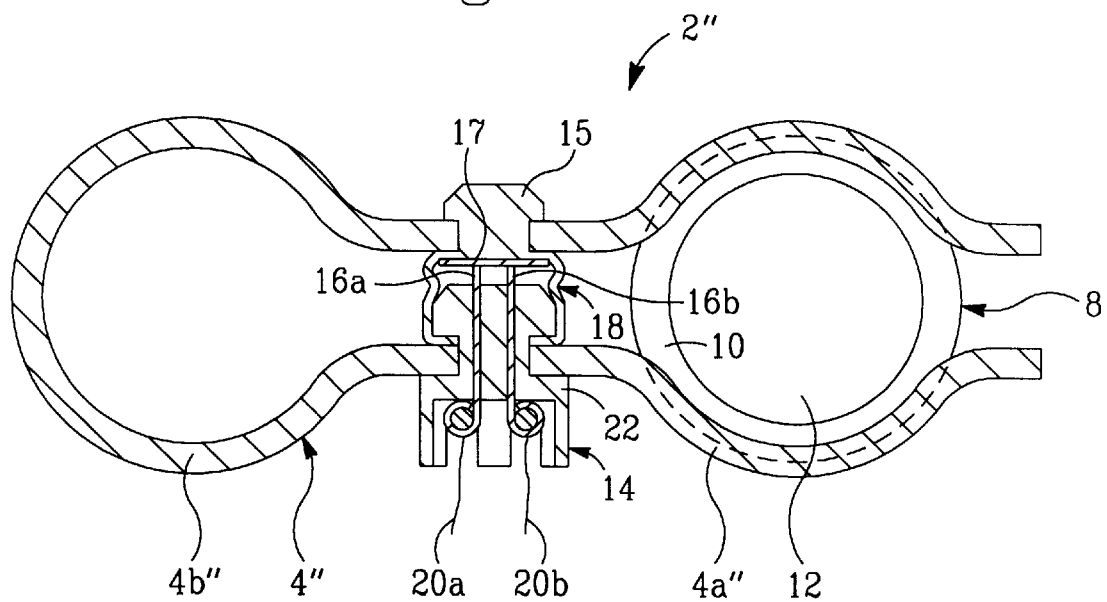
FIG. 8 is a cross-sectional view of a second alternate embodiment of the present invention.

FIG. 8 is a cross-sectional view of a second alternate embodiment of the travel limit sensor 2" of the present invention where the spring member 4" has been modified to permit the switch assembly 14 to be mounted between the rod section 4A" and the spring section 4B". As the large diameter section 10 of the actuator rod 8 encounters the rod section 4A", the first and second electrical contacts are pulled away from the conduction plate 17 thereby operating in a manner similar to the embodiment disclosed with reference to FIG. 1.

Although this present invention has been described in its preferred form within a certain degree of particularity, it is understood that the present disclosure of the preferred embodiment has been made only by way of example, and that numerous changes in the detail construction in combination and arrangement of the elements may be resorted to without parting from the spirit and the scope of the invention as hereinafter claimed.

We claim:

1. A brake actuator having an actuator rod connecting the vehicle brake to the brake actuator with a switch device mounted to the brake actuator to signal when the actuator rod reaches a predetermined travel limit position comprising:

an actuator housing having a base, said actuator rod extending therethrough, said actuator rod having a small section and a large section;

a spring member at least partially encircling said actuator rod, said spring member having a first section and an opposing second section, said spring member adapted to make contact with said large section when said actuator rod reaches the predetermined travel limit position;

a switch device mounted to said first section of said spring member and adapted to change state when said spring member contacts said large section; and an electronic module electrically connected to said switch device for generating a diagnostic service signal.

2. The brake actuator of claim 1, wherein said switch device further comprises a first electrical contact and a second electrical contact extending to make electrical contact with said second section of said spring member.

3. The brake actuator of claim 1, wherein said switch device further comprises a first electrical contact and a second electrical contact extending to make electrical contact with a conduction plate mounted to said second section of said spring member.

4. The brake actuator of claim 1, wherein said spring member has a first partial loop section centered with said actuator rod and a second partial loop section joined to said first partial loop section, said second partial loop section providing a spring force to said spring member.

5. The brake actuator of claim 1, wherein said switch device comprises first and second electrical contacts extending to contact said second section of said spring member thereby providing electrical conductivity through said first and second electrical contacts.

6. The brake actuator of claim 5 further comprising a conduction plate attached to said second section of said spring member opposite to said first and second electrical contacts.

7. The brake actuator of claim 5, wherein said first and second electrical contacts are shielded from the environment by a molded boot.

8. The brake actuator of claim 1, wherein said switch device is a normally open switch having a push button for activation where said second section of said spring member contacts and pushes against said push button and allows said switch to open when said spring member engages said large section of said actuator rod.

\* \* \* \* \*